United States Patent
Choi et al.

(10) Patent No.: US 11,569,526 B2
(45) Date of Patent: Jan. 31, 2023

(54) HIGH ENERGY DENSITY ALL-SOLID-STATE BATTERY AND METHOD FOR MANUFACTURING THE SAME

(71) Applicants: HYUNDAI MOTOR COMPANY, Seoul (KR); KIA MOTORS CORPORATION, Seoul (KR)

(72) Inventors: Yong Seok Choi, Seoul (KR); Hong Seok Min, Yongin-si (KR); Soon Chul Byun, Yongin-si (KR); Yun Sung Kim, Seoul (KR); Yong Gu Kim, Suwon-si (KR); Jae Min Lim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 372 days.

(21) Appl. No.: 16/704,113

(22) Filed: Dec. 5, 2019

(65) Prior Publication Data

US 2020/0350611 A1 Nov. 5, 2020

(30) Foreign Application Priority Data

May 3, 2019 (KR) ........................ 10-2019-0052240

(51) Int. Cl.
| | |
|---|---|
| *H01M 10/04* | (2006.01) |
| *H01M 10/0585* | (2010.01) |
| *H01M 10/0525* | (2010.01) |
| *H01M 10/0562* | (2010.01) |

(52) U.S. Cl.
CPC ... *H01M 10/0468* (2013.01); *H01M 10/0525* (2013.01); *H01M 10/0562* (2013.01); *H01M 10/0585* (2013.01)

(58) Field of Classification Search
CPC ......... H01M 10/0468; H01M 10/0585; H01M 10/0562
See application file for complete search history.

(56) References Cited

U.S. PATENT DOCUMENTS

| | | | | |
|---|---|---|---|---|
| 11,069,895 B2 * | 7/2021 | Cho | ...................... | H01M 4/622 |
| 2009/0111031 A1 * | 4/2009 | Hirose | .............. | H01M 10/0568 429/332 |
| 2014/0082931 A1 * | 3/2014 | Nishino | ............ | H01M 10/0585 29/623.4 |
| 2015/0188195 A1 * | 7/2015 | Matsushita | ....... | H01M 10/0468 429/152 |

(Continued)

FOREIGN PATENT DOCUMENTS

| | | | |
|---|---|---|---|
| KR | 10-1750145 B1 | 6/2017 | |
| WO | WO-2012002304 A1 * | 1/2012 | .......... H01M 10/052 |

*Primary Examiner* — Matthew J Merkling
(74) *Attorney, Agent, or Firm* — Lempia Summerfield Katz LLC

(57) ABSTRACT

Disclosed are an all-solid-state battery having high energy density and a method for manufacturing the same. One battery structure is pressed instead of pressing each cell unit, an amount of first or second electrode current collectors consumed is reduced, and insulating members are used, thereby simplifying a manufacturing process of the all-solid-state battery and allowing the all-solid-state battery to have high energy density and a stable structure.

20 Claims, 6 Drawing Sheets

(56) References Cited

U.S. PATENT DOCUMENTS

| | | | | |
|---|---|---|---|---|
| 2016/0156064 A1* | 6/2016 | Miyashita | ............... | C01B 25/14 |
| | | | | 429/323 |
| 2016/0293942 A1* | 10/2016 | Yamamoto | ............. | C01B 25/45 |
| 2017/0207482 A1* | 7/2017 | Tomura | ............. | H01M 10/0525 |
| 2017/0214017 A1* | 7/2017 | Pflueger | ................ | H01M 50/24 |
| 2018/0294469 A1* | 10/2018 | Hasegawa | ......... | H01M 10/0468 |
| 2019/0363317 A1* | 11/2019 | Honda | ................ | H01M 10/052 |
| 2020/0185779 A1* | 6/2020 | Kawakami | ........ | H01M 10/0565 |
| 2020/0259128 A1* | 8/2020 | Tanaka | .................. | H01M 4/386 |
| 2020/0313229 A1* | 10/2020 | Haga | .................. | H01M 4/0435 |
| 2020/0373624 A1* | 11/2020 | Choi | ................... | H01M 4/0404 |
| 2021/0280897 A1* | 9/2021 | Ikeda | ................ | H01M 10/0468 |
| 2021/0296689 A1* | 9/2021 | Isono | ................ | H01M 10/0468 |
| 2021/0296695 A1* | 9/2021 | Sasaki | .................. | H01M 10/44 |

\* cited by examiner

HIGH ENERGY DENSITY ALL-SOLID-STATE BATTERY AND METHOD FOR MANUFACTURING THE SAME

CROSS-REFERENCE TO RELATED APPLICATION

This application claims priority to and the benefit of Korean Patent Application No. 10-2019-0052240, filed on May 3, 2019, the entire contents of which are incorporated herein by reference.

FIELD

The present disclosure relates to an all-solid-state battery having high energy density and a method for manufacturing the same.

BACKGROUND

The statements in this section merely provide background information related to the present disclosure and may not constitute prior art.

In general, rechargeable secondary batteries are used not only in small electronic apparatuses, such as a mobile phone, a notebook computer, etc., but also in large transportation, such as a hybrid electric vehicle, an electric vehicle, etc.

Most conventional secondary batteries constitute cells based on an organic solvent (organic liquid electrolyte), and thus show the limitations of improvement in stability and energy density.

On the other hand, all-solid-state batteries using an inorganic solid electrolyte are manufactured based on technology in which an organic solvent is excluded, and thus allow cells thereof to be manufactured in a safer and simpler form and are in the spotlight now.

However, actual energy density and output of the all-solid-state batteries are inferior to those of conventional lithium ion batteries using a liquid electrolyte. Since, in the all-solid-state batteries, an electrolyte membrane including a solid electrolyte is located between a cathode and an anode, the all-solid-state batteries have high volume and weight, as compared to the conventional lithium ion batteries, and thus have low energy density per volume and energy density per weight. If the thickness of the electrolyte membrane is reduced, a short circuit between the cathode and the anode may occur.

The above information disclosed in this Background section is only for enhancement of understanding of the background of the present disclosure, and therefore it may contain information that does not form the prior art that is already known to a person of ordinary skill in the art.

SUMMARY

The present disclosure provides an all-solid-state battery which may have high stability and energy density while exerting original functions thereof as a secondary battery.

The present disclosure also provides a method for manufacturing an all-solid-state battery in which a short circuit occurring at the edge part of the battery may be prevented or inhibited through a simple process and the all-solid-state battery may be effectively manufactured.

In one aspect, the present disclosure provides an all-solid-state battery including first units, each first unit including a first electrode current collector, and first electrode active material layers formed on both surfaces of the first electrode current collector. Also provided are second units, each second unit including a second electrode current collector, second electrode active material layers formed on both surfaces of the second electrode current collector. The battery also includes solid electrolyte layers formed on the second electrode active material layers, wherein the first units and the second units are alternately stacked. The battery also includes insulating members received in spaces between edge parts of the first electrode active material layers and side surfaces of the second units.

In one form, the all-solid-state battery may further include third units, each third unit including a third electrode current collector, and a third electrode active material layer formed on one surface of the third electrode current collector, and the third units may be located at outermost positions of the all-solid-state battery.

In another form, an area of a first unit may be greater than or equal to an area of the second unit.

In still another form, a second unit may be placed on a central part of the first electrode active material layer so that a first electrode active material layer and a solid electrolyte layer are stacked to contact each other.

In yet another form, an area of a central part of a first electrode active material layer may be greater than or equal to an area of a second unit.

In another form, a sum of thicknesses of one insulating member and another insulating member adjacent thereto may be the same as a thickness of the second unit.

In another form, the insulating members may surround side surfaces of the second units, and be formed of a transparent material.

In another form, the first unit may be configured such that one first electrode current collector having a thickness of 4-20 µm is interposed between a pair of first electrode active material layers.

In still another form, the second unit may be configured such that one second electrode current collector having a thickness of 5-20 µm is interposed between a pair of second electrode active material layers.

In yet another form, the first electrode active material layer may be a thickness of 50-300 µm, a mixture density of 1.2-3.5 g/cc, a loading level of 10-45 mg/cm$^2$, and a lightness value of 30-80 in the CIELAB color space.

In another form, the second electrode active material layer may have a thickness of 50-300 µm, a mixture density of 2.5-5.0 g/cc, a loading level of 10-35 mg/cm$^2$, and a lightness value of 40-90 in the CIELAB color space.

In another aspect, the present disclosure provides a method for manufacturing an all-solid-state battery, including preparing first units, each first unit including a first electrode current collector, and first electrode active material layers formed on both surfaces of the first electrode current collector. The method includes forming insulating members at edge parts of the first electrode active material layers. The method includes preparing second units, each second unit including a second electrode current collector, second electrode active material layers formed on both surfaces of the second electrode current collector, and solid electrolyte layers formed on the second electrode active material layers. The method includes acquiring a battery structure by alternately stacking the first units and the second units, and pressing the battery structure.

In one form, the method may further include, before the pressing the battery structure, stacking third units, each third unit including a third electrode current collector, and a third electrode active material layer formed on one surface of the third electrode current collector, on outermost layers of the battery structure.

In another form, the battery structure may be configured such that the second unit is placed on a central part of the first electrode active material layer and thus the first electrode active material layer and the solid electrolyte layer are stacked to contact each other.

In still another form, a sum of thicknesses of one insulating member and another insulating member adjacent thereto may be the same as a thickness of the second unit.

In yet another form, the insulating members may surround side surfaces of the second units, and be formed of a transparent material.

In another form, in the preparing the first units and the preparing the second units, the first units and the second units may not be pressed.

In a further form, the pressing the battery structure may be performed at a pressure of 250 to 500 MPa.

Other aspects of the disclosure are discussed infra.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 7A:
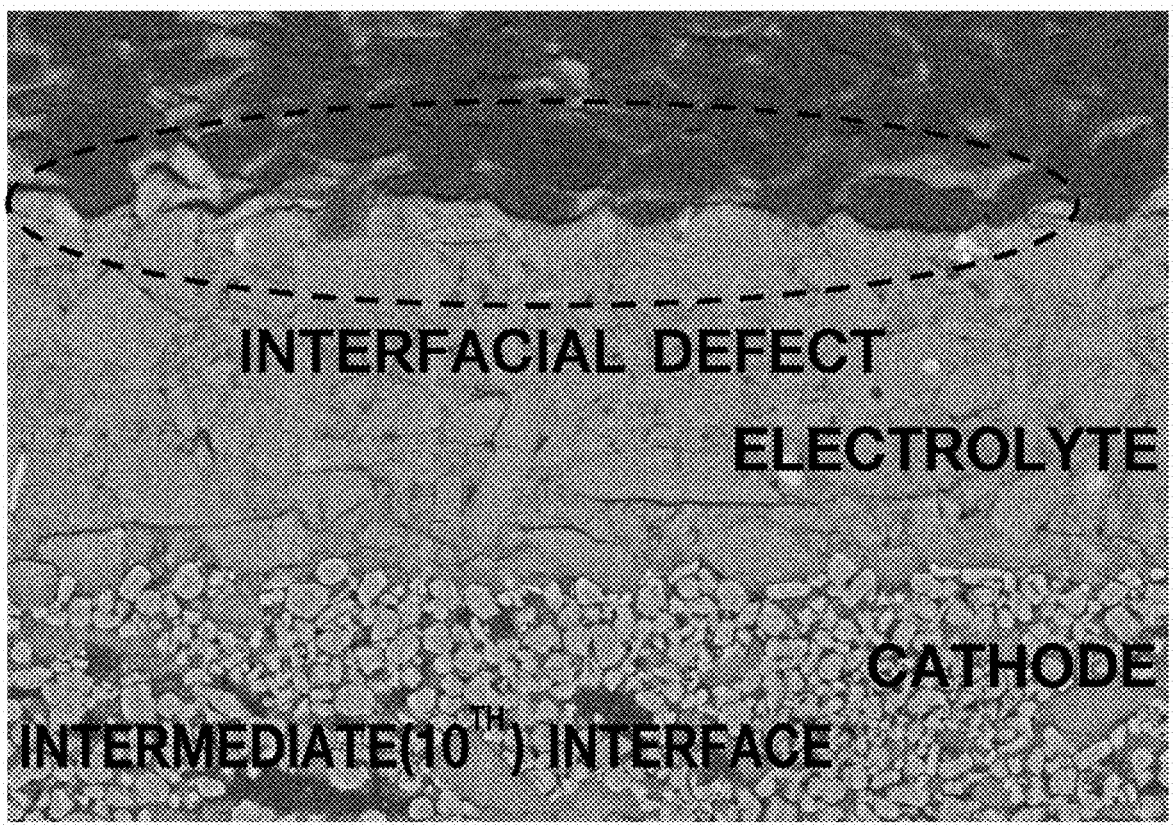
Figure 7B:
Figure 7C:
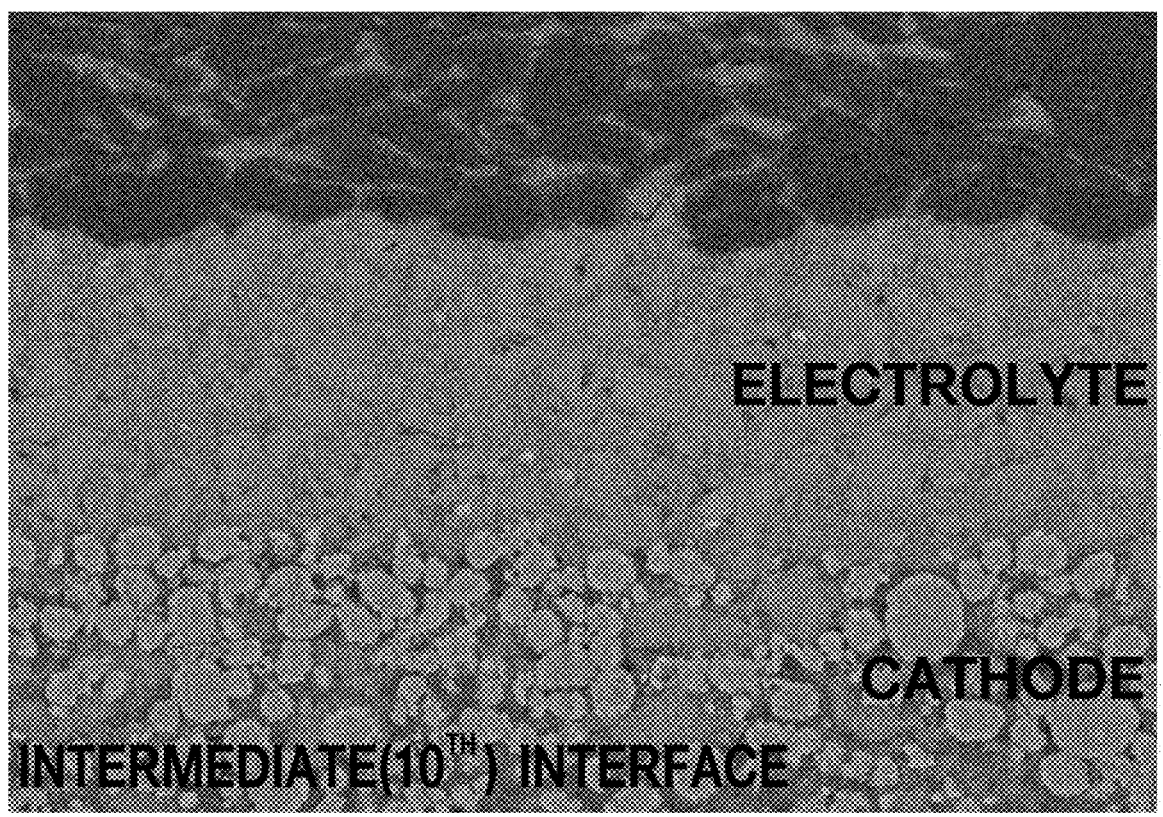
Figure 7D:
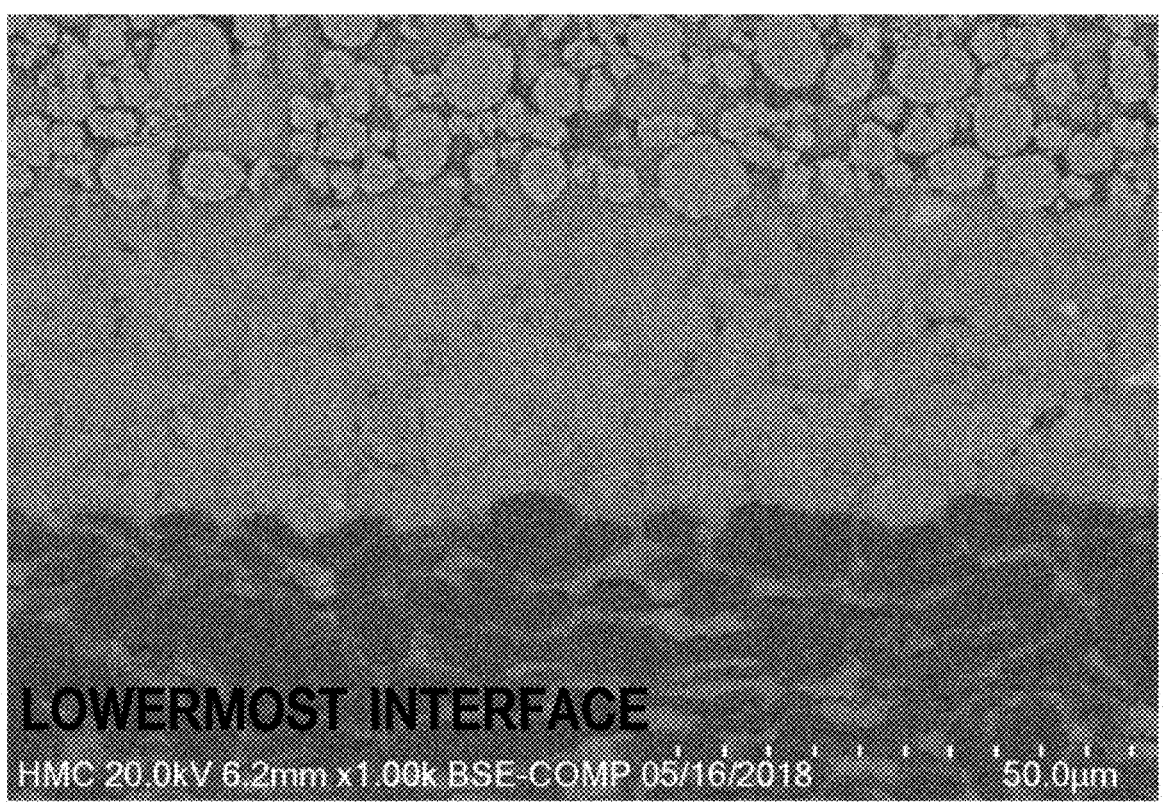

FIGS. 7A and 7B are views illustrating results of observation of an intermediate ($10^{th}$) interface and a lowermost interface of a battery structure according to an example of the present disclosure, after the battery structure was pressed at 200 MPa; and FIGS. 7C and 7D are views illustrating results of observation of the intermediate ($10^{th}$) interface and the lowermost interface of the battery structure according to the example of the present disclosure, after the battery structure was pressed at 300 MPa.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawings.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding references numerals indicate like or corresponding parts and features.

Hereinafter reference will be made in detail to various forms of the present disclosure, examples of which are illustrated in the accompanying drawings and described below. While the disclosure will be described in conjunction with exemplary forms, it will be understood that the present description is not intended to limit the disclosure to the exemplary forms. On the contrary, the disclosure is intended to cover not only the exemplary forms, but also various alternatives, modifications, equivalents and other forms within the spirit and scope of the disclosure as defined by the appended claims.

In the following description of the forms, the same elements are denoted by the same reference numerals even though they are depicted in different drawings. In the drawings, dimensions of structures are exaggerated as compared to actual dimensions thereof, for clarity of description. In the following description of the forms, terms, such as "first", "second", etc., may be used to describe various elements but do not limit the elements. These terms are used only to distinguish one element from other elements. For example, a first element may be named a second element and similarly the second element may be named the first element, within the spirit and scope of the disclosure. Singular expressions may encompass plural expressions, unless they have clearly different contextual meanings.

In the following description of the forms, terms, such as "including", "having", etc., will be interpreted as indicating the presence of characteristics, numbers, steps, operations, elements or parts stated in the description or combinations thereof, and do not exclude the presence of one or more other characteristics, numbers, steps, operations, elements, parts or combinations thereof, or possibility of adding the same. In addition, it will be understood that, when a part, such as a layer, a film, a region or a plate, is said to be "on" another part, the part may be located "directly on" the other part or other parts may be interposed between both parts. In the same manner, it will be understood that, when a part, such as a layer, a film, a region or a plate, is said to be "under" another part, the part may be located "directly under" the other part or other parts may be interposed between both parts.

All numbers, values, and/or expressions representing amounts of components, reaction conditions, polymer compositions, and blends used in the description are approximations, in which various uncertainties in measurement generated when these values are acquired are reflected and thus, it will be understood that they are modified by the term "about", unless stated otherwise. In addition, it will be understood that, if a numerical range is disclosed in the description, such a range includes all continuous values from a minimum value to a maximum value of the range, unless stated otherwise. Further, if such a range refers to integers, the range includes all integers from a minimum integer to a maximum integer, unless stated otherwise.

Figure 1:
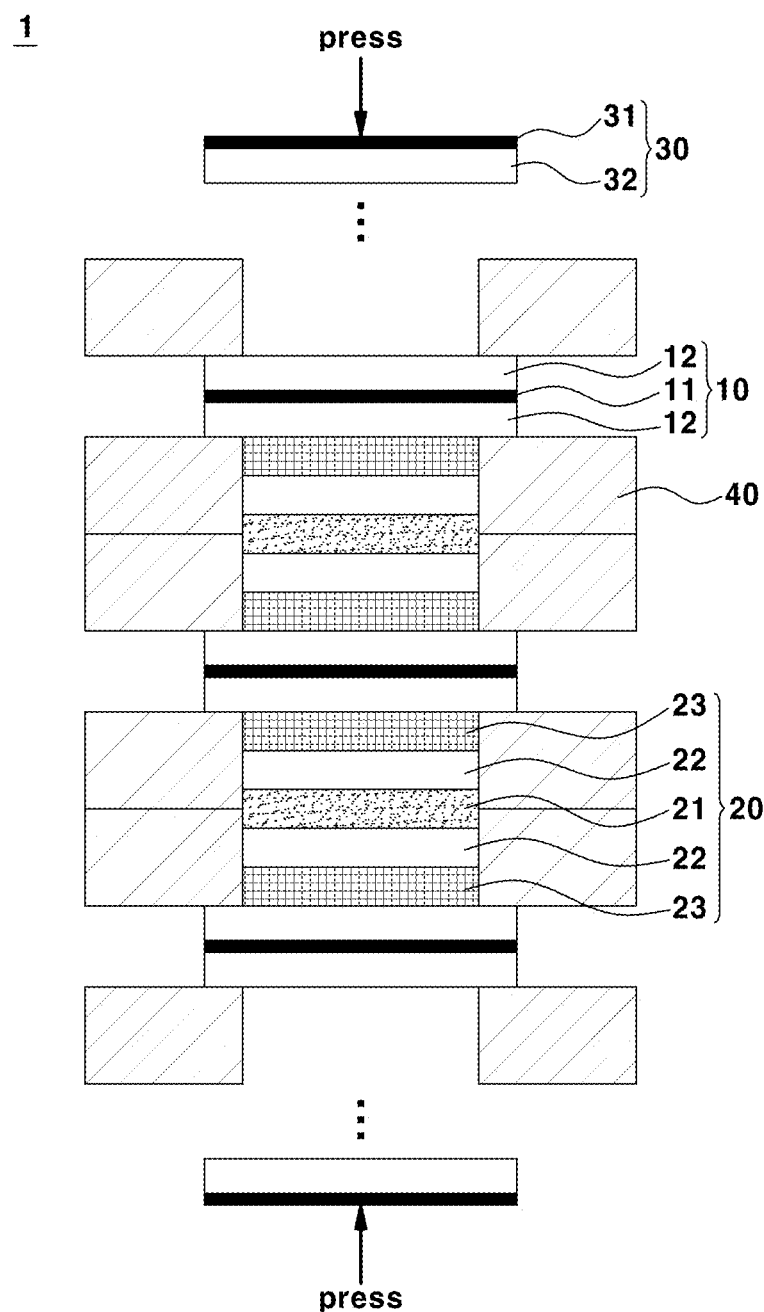
FIG. 1 is a cross-sectional view schematically illustrating an all-solid-state battery in accordance with the present disclosure.

FIG. 1 is a cross-sectional view schematically illustrating an all-solid-state battery 1 in accordance with the present disclosure. Referring to FIG. 1, the all-solid-state battery 1 includes first units 10, second units 20, third units 30 located at the outermost positions of a battery structure, and insulating members 40 received in spaces between edge parts of the first units 10 and side surface parts of the second units 20.

In a first electrode current collector 11, a second electrode current collector 21 and a third electrode current collector 31 included in the all-solid-state battery, each of a first electrode, a second electrode and a third electrode may be a cathode or an anode.

Particularly, the first electrode and third electrode may have the same polarity, and the second electrode may have different polarities. For example, if the first electrode is a cathode, the second electrode may be an anode and the third electrode may be the cathode. Further, if the first electrode is an anode, the second electrode may be a cathode and the third electrode may be an anode. More particularly, the first electrode may be an anode, the second electrode may be a cathode, and the third electrode may be an anode.

First Unit

Figure 2:
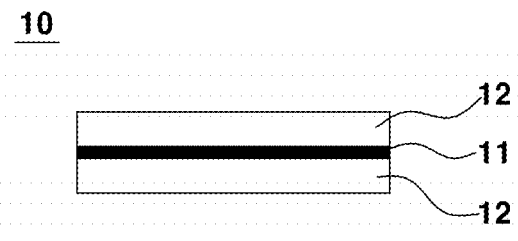
FIG. 2 is a cross-sectional view schematically illustrating a first unit in accordance with the present disclosure.

FIG. 2 is a cross-sectional view schematically illustrating the first unit 10. Referring to FIG. 2, the first unit 10 includes the first electrode current collector 11 and a first electrode active material layer 12 formed on each of both surfaces of the first electrode current collector 11.

The first electrode may be a cathode or an anode. If the first electrode is an anode, the second electrode may be a cathode, and, if the first electrode is a cathode, the first electrode may be an anode, without being limited thereto. Particularly, the first electrode may be an anode.

The first electrode current collector 11 may be formed of any material which has conductivity and a current collecting function, without being limited thereto. The material of the first electrode current collector 11 may be one selected from the group consisting of copper (Cu), copper (Cu) coated with carbon (C), and nickel (Ni). Further, the first electrode current collector 11 may be formed as, for example, a nickel mesh, copper foil, or the like.

The first electrode current collector 11 may have a thickness of about 4 to 20 μm. For example, the first electrode current collector 11 formed of copper (Cu) may have a thickness of 5 to 15 μm, the first electrode current collector 11 formed of copper (Cu) coated with carbon (C) may have a thickness of 7 to 20 μm, or the first electrode current collector 11 formed of nickel (Ni) may have a thickness of 4 to 20 μm.

The first electrode active material layers 12 may include a first electrode active material, a solid electrolyte, a conductive material, a binder, etc.

As the first electrode active material, a carbon material, such as natural graphite, artificial graphite, graphite carbon fiber or resin-baked carbon, or an alloy material which is mixed with the solid electrolyte may be used. For example, the alloy material may be a lithium alloy (LiAl, LiZn, Li3Bi, Li3Cd, Li3Sb, Li4Si, Li4.4Pb, Li4.4Sn, Li0.17C, LiC6 or the like), or a metal oxide, such as lithium titanate (Li4Ti5O12) or Zn.

The solid electrolyte may be in charge of conduction of lithium ions in the first electrode active material layers 12, and be an oxide-based solid electrolyte or a sulfide-based solid electrolyte. Particularly, a sulfide-based solid electrolyte having high lithium ion conductivity may be used.

The sulfide-based solid electrolyte may be Li2S—P2S5, Li2S—P2S5—LiI, Li2S—P2S5—LiCl, Li2S—P2S5—LiBr, Li2S—P2S5—Li2O, Li2S—P2S5—Li2O—LiI, Li2S—SiS2, Li2S—SiS2—LiI, Li2S—SiS2—LiBr, Li2S—SiS2—LiCl, Li2S—SiS2—B2S3—LiI, Li2S—SiS2—P2S5—LiI, Li2S—B2S3, Li2S—P2S5—ZmSn (here, m and n are positive numbers, and Z is one selected from the group consisting of Ge, Zn and Ga), Li2S—GeS2, Li2S—SiS2—Li3PO4, Li2S—SiS2—LixMOy (here, x and y are positive numbers, and M is one selected from the group consisting of P, Si, Ge, B, Al, Ga and In), Li10GeP2S12 or the like.

The sulfide-based solid electrolyte may have an average particle size (D50) of 0.1 to 10 μm.

The sulfide-based solid electrolyte having lithium ion conductivity of $1 \times 10^{-4}$ S/cm may be used.

The conductive material may be carbon black, conductive graphite, ethylene black, graphene or the like.

The binder of the first electrode active materials 12 may be butadiene rubber (BR), nitrile butadiene rubber (NBR), hydrogenated nitrile butadiene rubber (HNBR), polyvinylidene difluoride (PVDF), polytetra fluoroethylene (PTFE), carboxymethyl cellulose (CMC) or the like, without being limited thereto.

The first electrode active material layers 12 may have a thickness of 50-300 μm, a mixture density of 0.1-2.0 g/cc before pressing, a mixture density of 1.2-3.5 g/cc after pressing, a loading level of 10-45 mg/cm$^2$, and a lightness value of 30-80 in the CIELAB color space.

In the present disclosure, the term 'loading level' means a loading amount of materials constituting the first electrode active material layers 12.

If cell units, each of which includes an anode, a cathode and a solid electrolyte, are stacked as in the conventional process, first electrode current collectors or second electrode current collectors are stacked and thus two current collectors overlap each other. Therefore, the conventional laminate has a large amount of the current collectors consumed and thus causes lowering of energy density. In contrast, one first electrode current collector 11 is interposed between a pair of first electrode active material layers 12, and thus, an amount of the first electrode current collector 11 consumed is reduced, as compared to the conventional process, and an all-solid-state battery which is manufactured through a simple process and has high energy density may be acquired.

Second Unit

Figure 3:
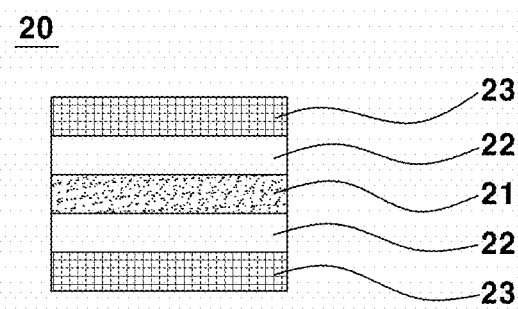
FIG. 3 is a cross-sectional view schematically illustrating a second unit in accordance with the present disclosure.

FIG. 3 is a cross-sectional view schematically illustrating the second unit 20. Referring to FIG. 3, the second unit 20 includes the second electrode current collector 21, second electrode active material layers 22 formed on both surfaces of the second electrode current collector 21, and solid electrolyte layers 23 formed on the second electrode active material layers 22.

The second electrode may be a cathode or an anode. If the second electrode is a cathode, the first electrode may be an anode, and, if the second electrode is an anode, the first electrode may be a cathode, without being limited thereto. Particularly, the second electrode may be a cathode.

The second electrode current collector 21 may be formed of any material which has conductivity and a current collecting function, without being limited thereto.

The material of the second electrode current collector 21 may be aluminum (Al) or aluminum (Al) coated with carbon (C). Further, the second electrode current collector 21 may be formed as, for example, aluminum foil.

The second electrode current collector 21 may have a thickness of about 5 to 20 μm. For example, the second electrode current collector 21 formed of aluminum (Al) may have a thickness of 5 to 15 μm, or the second electrode current collector 21 formed of aluminum (Al) coated with carbon (C) may have a thickness of 7 to 20 μm.

The second electrode active material layers 22 may include a second electrode active material, a solid electrolyte, a conductive material, a binder, etc.

The second electrode active material may be an oxide active material or a sulfide active material.

The oxide active material may be a rock salt-type active material, such as LiCoO2, LiMnO2, LiNiO2, LiVO2 or Li1+xNi⅓Co⅓Mn1/3O2, a spinel-type active material, such as LiMn2O4 or Li(Ni0.5Mn1.5)O4, an inverted spinel-type active material, such as LiNiVO4 or LiCoVO4, an olivine-type active material, such as LiFePO4, LiMnPO4, LiCoPO4 or LiNiPO4, a silicon-containing active material, such as Li2FeSiO4 or Li2MnSiO4, a rock salt-type active material in which a part of a transition metal is substituted with a different kind of metal, such as LiNi0.8Co(0.2−x)AlxO2 (0<x<0.2), a spinel-type active material in which a part of a transition metal is substituted with a different kind of metal, such as Li1+xMn2−x−yMyO4 (M is at least one of Al, Mg, Co, Fe, Ni or Zn, 0<x+y<2), or lithium titanate, such as Li4Ti5O12.

The sulfide active material may be copper Chevrel, iron sulfide, cobalt sulfide, nickel sulfide or the like.

The solid electrolyte may be an oxide-based solid electrolyte or a sulfide-based solid electrolyte, and be the same as or different from the solid electrolyte included in the first electrode active material layers 12.

The conductive material may be carbon black, conductive graphite, ethylene black, graphene or the like.

The binder may be butadiene rubber (BR), nitrile butadiene rubber (NBR), hydrogenated nitrile butadiene rubber (HNBR), polyvinylidene difluoride (PVDF), polytetra fluoroethylene (PTFE), carboxymethyl cellulose (CMC) or the like, and the same as or different from the binder included in the first electrode active material layers 12.

The second electrode active material layers 22 may have a thickness of 50-300 μm, a mixture density of 0.5-3.0 g/cc before pressing, a mixture density of 2.5-5.0 g/cc after pressing, a loading level of 10-35 mg/cm2, and a lightness value of 40-90 in the Lab color space.

The solid electrolyte layers 23 are provided on the second electrode active material layers 22 so as to allow lithium ions to move between both electrodes.

The first electrode active material layers and the second electrode active material layers are positioned and in contact with both surfaces of the solid electrolyte layer, respectively.

The solid electrolyte layers 23 may include an oxide-based solid electrolyte or a sulfide-based solid electrolyte. Here, the solid electrolyte may be the same as or different from the solid electrolyte included in the first electrode active material layers 12.

One second electrode current collector 21 is interposed between a pair of second electrode active material layers 22. Therefore, in the same manner as the first electrode current collector 11, an amount of a cathode current collector consumed is reduced, as compared to the conventional laminate. Consequently, an all-solid-state battery which is manufactured through a simple process and has high energy density may be acquired.

Insulating Member

Figure 4:
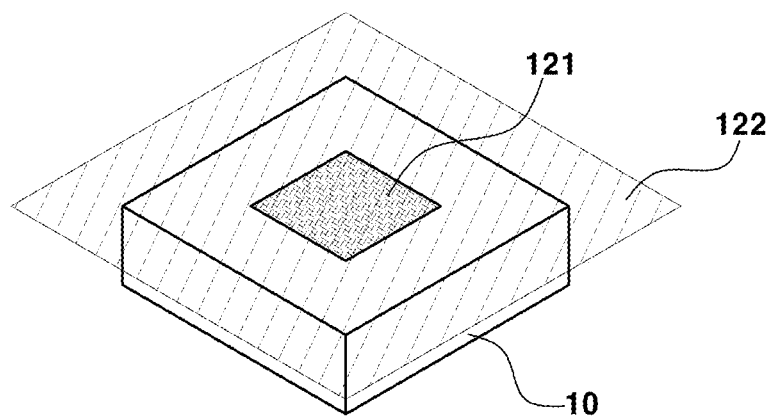
FIG. 4 is a perspective view schematically illustrating a central part and an edge part of the first unit in accordance with the present disclosure.

FIG. 4 is a perspective view schematically illustrating the first electrode active material layer 12 and the insulating member 40. Referring to FIGS. 1 and 4, the second unit 20 is placed on a central part 121 of the first electrode active material layer 12 so that the first electrode active material layer 12 and the solid electrolyte layer 23 contact each other. Here, the insulating member 40 is located at an edge part 122 of the first electrode active material layer 12, and thus surrounds the side surface of the second unit 20. Further, referring to FIG. 1, in a state in which a plurality of first units 10 and a plurality of second units 20 are stacked, the sum of the thicknesses of one insulating member 40 and another insulating member 40 adjacent thereto is the same as the thickness of the second unit 20.

The insulating members 40 may be formed of any material which has an insulating function, without being limited thereto.

The insulating members 40 may be formed of a transparent material, and include one selected from the group consisting of polyethylene terephthalate (PET), polyimide (PI), polypropylene (PP), polyethylene (PE) and polycarbonate (PC). Since the insulating member 40 is formed of a transparent material, the insulating member 40 does not obstruct a field of view. Therefore, if a vision apparatus for alignment when the respective units are stacked is used, light may penetrate the insulating members 40 formed of the transparent material, and thus an alignment state of the respective units of the battery structure may be easily detected.

Third Unit

Figure 5:
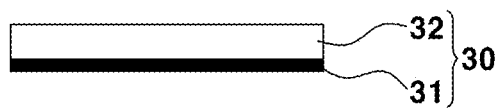
FIG. 5 is a cross-sectional view schematically illustrating a third unit in accordance with the present disclosure.

FIG. 5 is a cross-sectional view schematically illustrating the third unit 30. Referring to FIG. 5, the third unit 30 includes the third electrode current collector 31 and a third electrode active material layer 32 formed on one surface of the third electrode current collector 31. The third electrode may be a cathode or an anode. For example, if the first electrode is an anode, the second electrode is a cathode and the third electrode is an anode. Further, if the first electrode is a cathode, the second electrode is an anode and the third electrode is a cathode, without being limited thereto. Particularly, the third electrode may be an anode.

The third unit 30 is located at the outermost position of the all-solid-state battery 1 and is thus directly pressed.

The material and thickness of the third electrode current collector 31 are the same as the material and thickness of the first electrode current collector 11.

The material, thickness, mixture density, loading level, and lightness value of the third electrode active material layer 32 are the same as the material, thickness, mixture density, loading level, and lightness value of the first electrode active material layer 12.

If both the first units 10 and the second units 20 are alternately stacked, a surplus electrode (the first electrode active material layer 12 or the solid electrolyte layer 23+second electrode active material layer 22) remains at the outermost position of the all-solid-state battery 1. Therefore, the third units 30 are disposed at the outermost positions of the all-solid-state battery 1 and may thus reduce the surplus electrodes. Therefore, the amount of materials and volume of the all-solid-state battery 1 may be reduced and thus energy density may be improved.

Figure 6:
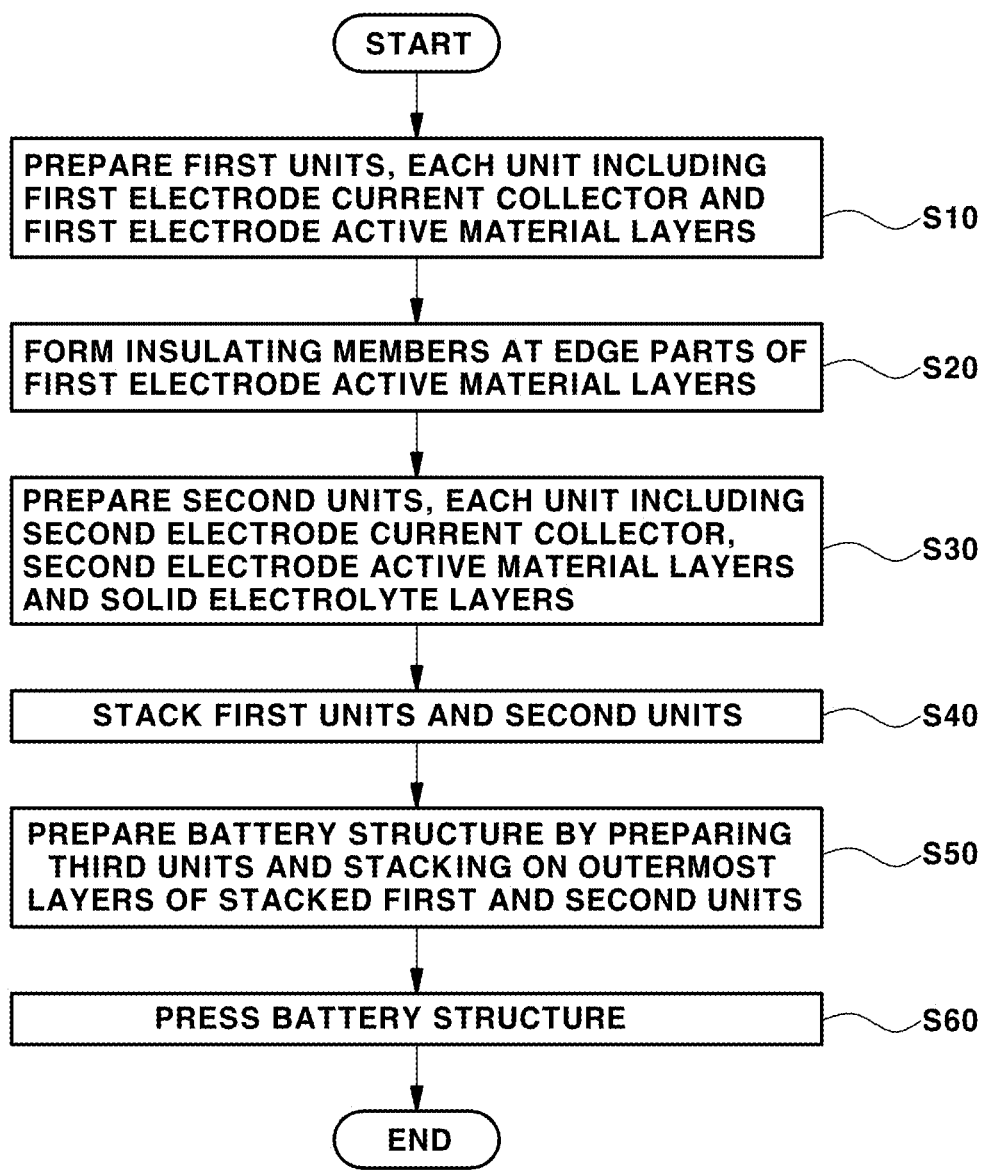
FIG. 6 is a flowchart illustrating a method for manufacturing an all-solid-state battery in accordance with the present disclosure.

FIG. 6 is a flowchart illustrating a method for manufacturing the all-solid-state battery 1 in accordance with the present disclosure. Referring to FIG. 6, the method includes preparing the first units 10, each of which includes the first electrode current collector 11 and the first electrode active material layers 12 (Operation S10), forming the insulating members 40 at the edge parts 122 of the first electrode active material layers 12 (Operation S20), preparing the second units 20, each of which includes the second electrode current collector 21, the second electrode active material layers 22 and the solid electrolyte layers 23 (Operation S30), stacking the first units 10 and the second units 20 (Operation S40), preparing a battery structure by preparing the third units 30 and stacking the third units 30 on the outermost layers of the stacked first and second units 10 and 20 (Operation S50), and pressing the battery structure (Operation S60).

In preparation of the first units 10 (Operation S10), the first electrode active material layers 12 are formed on both surfaces of the first electrode current collector 11. Formation of the first electrode active material layers 12 on both surfaces of the first electrode current collector 11 is not limited to a specific method. For example, a slurry coating process, a blast method, an aerosol deposition method, a cold spray method, a sputtering method, a vapor deposition method or a spraying method may be used, and particularly, the slurry coating process may be used.

The slurry coating process may be executed by preparing a slurry including the first electrode active material, coating both surfaces of the first electrode current collector 11 with the prepared slurry and then drying the slurry. Such a slurry coating process on the first electrode current collector 11 may be performed by a dam type slurry coater method, a doctor blade method, a gravure transfer method, a reverse roll coater method, a die coating method or the like.

The slurry including the first electrode active material may be prepared by mixing the first electrode active material, a solvent, and, if desired, a solid electrolyte and a binder, through a conventionally known method.

The solvent used to prepare the slurry may employ any solvent which does not have a negative influence on performance of the first electrode active material, without being limited thereto and, for example, employ a hydrocarbon-based organic solvent, such as heptane, toluene or hexane, and particularly, a hydrocarbon-based organic solvent having a low moisture content through dehydration. As the first electrode active material, the solid electrolyte and the binder which may be included in the slurry, the above-described materials which may be included in the first electrode active material layer 12 may be used.

In formation of the insulating members 40 (Operation S20), the insulating members 40 are formed at the edge parts 121 of the first electrode active material layers 12 of the first units 10.

Since the insulating members 40 are formed of a transparent material, if a vision apparatus for alignment when the respective units are stacked is used, light may penetrate the insulating members 40 formed of the transparent material, and thus alignment of the battery structure may be achieved and the battery structure may be stabilized.

In preparation of the second units 20 (Operation S30), the second electrode active material layers 22 are formed on both surfaces of the second electrode current collector 21, and the solid electrolyte layers 23 are formed on the second electrode active material layers 22.

Formation of the second electrode active material layers 22 on both surfaces of the second electrode current collector 21 may be the same as formation of the first electrode active material layers 12 on both surfaces of the first electrode current collector 11, or be formation of layers using a metal material in which lithium (Li) is oxidizable and reducible on both surfaces of the second electrode current collector 21. The metal material may include lithium (Li) or indium (Id).

Further, the solid electrolyte layers 23 may be formed on the second electrode active material layers 22. The solid electrolyte layers 23 may have a thickness which is selected according to desired battery characteristics, and particularly, have a thin thickness within a range that occurrence of a short circuit between the first electrode active material layer 12 and the second electrode active material layer 22 may be suppressed.

The solid electrolyte layers 23 may include a solid electrolyte, and, if desired, include a binder. The solid electrolyte may be formed of a material of a solid electrolyte which may be included in the second electrode active material layers 22, and, if the second electrode active material layers 22 include a solid electrolyte, the solid electrolyte included in the solid electrolyte layers 23 and the solid electrolyte included in the second electrode active material layers 22 may be formed of the same material. A material of the binder may be the same as the material of the binder included in the first electrode active material layers 12.

Formation of the solid electrolyte layers 23 on the second electrode active material layers 22 is not limited to a specific method. For example, a slurry coating process, a blast method, an aerosol deposition method, a cold spray method, a sputtering method, a vapor deposition method or a spraying method may be used, and particularly, the slurry coating process may be used.

The slurry coating process is the same as the slurry coating process to form the first electrode active material layers 12 on both surfaces of the first electrode current collector 11.

In stacking of the first units 10 and the second units 20 (Operation S40), the prepared first units 10 and second units 20 are stacked. In more detail, the second unit 20 is placed on the central part 121 of the first electrode active material layer 12 of the first unit 10 so that the first electrode active material layer 12 and the solid electrolyte layer 23 contact each other. Since the first unit 10 has an area which is greater than the area of the second unit 20 and the central part 121 of the first electrode active material layer 12 has an area which is greater than or the same as the area of the second unit 20, the insulating members 40 received in a space between the edge part 122 of the first electrode active material layer 12 and the side surface of the second unit 20 are stacked to surround the side surface of the second unit 20.

Further, in the conventional process, if cell units, each of which includes a first electrode, a second electrode and a solid electrolyte, are stacked, first electrode current collectors or second electrode current collectors are stacked so that the two current collectors overlap each other, an amount of the current collectors consumed is increased, and thus it is difficult to acquire an all-solid-state battery having high energy density. In contrast, in the present disclosure, one first electrode current collector 11 or one second electrode current collector 21 having a thickness of 4 to 20 μm is interposed between a pair of first electrode active material layers 12 or a pair of second electrode active material layers 22, an amount of the current collectors consumed is reduced, as compared to the conventional process, and thus, an all-solid-state battery which is manufactured through a simple process and has high energy density may be acquired.

Further, since the sum of the thicknesses of one insulating member 40 and another insulating member 40 adjacent thereto is the same as the thickness of the second unit 20, the insulating members 40 may prevent or inhibit occurrence of a short circuit at the edge part of the all-solid-state battery and align the second units 20 simultaneously, thus stabilizing the overall structure of the all-solid-state battery.

Here, the first units 10 and the second units 20 may be stacked as a jelly roll structure.

In preparation of the battery structure (Operation S50), the battery structure is prepared by stacking the third units 30, each of which includes the third electrode current collector 31 and the third electrode active material layer 32 formed on one surface of the third electrode current collector 31, on the outermost layers of the stacked first and second units 10 and 20. If the third units 30 are located at the outermost positions of the battery structure, the third electrode active material layers 32 are not formed as the outermost layers and thus the number of parts is reduced, and the number of process operations may be reduced as well.

In pressing of the battery structure (Operation S60), the prepared battery structure is pressed, and thus, the all-solid-state battery is manufactured.

Pressing of the battery structure may be performed by a surface pressing method, an ultra-high pressure isostatic pressing method, a 1-axis pressing method, a cold isostatic pressing (CIP) method or a hot pressing method, and particularly, be performed by the surface pressing method or the ultra-high pressure isostatic pressing method.

In the conventional process, the cell units are respectively pressed and then stacked, but, in the present disclosure, the battery structure is prepared and then finally pressed and thus the manufacturing process of the all-solid-state battery may be simplified.

When a battery structure in which first units and second units were alternately stacked 20 times was pressed at a pressure of 200 MPa, interfacial defects occurred, but, when the battery structure was pressed at a pressure of 300 MPa, no interfacial defects occurred. Therefore, in order to manufacture an all-solid-state battery which cells are normally operated in accordance with the present disclosure, a pressing condition may be 250 to 500 MPa.

Hereinafter, the present disclosure will be described in more detail through the following example. The following example serves merely to exemplarily describe the present disclosure and is not intended to limit the scope of the disclosure.

EXAMPLE (Operation S10): A first electrode current collector using copper (Cu), copper (Cu) coated with carbon (C) or nickel (Ni) was formed to have a thickness of 5 to 15 μm, 7 to 20 μm, or 4 to 20 μm. First electrode active material layers were formed on both surfaces of the first electrode current collector, using a slurry including a graphite-based first electrode active material, a butyrate-based solvent, a sulfide-based solid electrolyte and a rubber-based binder through a slurry coating process, and thereby first units were prepared. Here, a mixture density of the first electrode active material was 0.5 to 3.0 g/cc.

(Operation S20): A PI film was prepared as insulating members and located at the edge parts of the first electrode active material layers.

(Operation S30): A second electrode current collector using aluminum (Al) or aluminum (Al) coated with carbon (C) was formed to have a thickness of 5 to 15 μm or 7 to 20 μm. Second electrode active material layers were formed on both surfaces of the second electrode current collector, using a slurry including a 3-component second electrode active material (for example, a nickel-cobalt-manganese (NCM)-based active material), a butyrate-based solvent, a sulfide-based solid electrolyte and a rubber-based binder through a slurry coating process. Here, a mixture density of the second electrode active material was 0.1 to 2.0 g/cc. Further, solid electrolyte layers were formed on the second electrode active material layers, using a slurry including a sulfide-based solid electrolyte and a rubber-based binder through a slurry coating process, and thereby second units were prepared.

(Operation S40): The first units and the second units were stacked. In more detail, the first units and the second units were stacked such that the second unit is placed on the central part of the first electrode active material layer of the first unit, and thus, the first electrode active material layer and the solid electrolyte layer contact each other and the insulating members are received in a space between the edge part of the first electrode active material layer and the side surface of the second unit.

(Operation S50): The same first electrode current collector used in Operation S10 was used. Further, the first electrode active material layer was formed on one surface of the first electrode current collector, using the same slurry used in Operation S10 through the same process, and thereby third units were prepared. The third units are stacked on the outermost layers of a structure acquired by Operation S40, and thereby a battery structure was manufactured.

(Operation S60): The battery structure was pressed so that the first electrode active material layers and the second electrode active material layers have a thickness of 50 to 300 μm.

Test Example 1—Setting of Pressing Range

In order to manufacture an all-solid-state battery according to the above example, a test on an improved pressing range was performed. FIGS. 7A to 7D illustrate results of the test.

FIGS. 7A and 7B are views illustrating observation results of an intermediate (10th) interface and a lowermost interface of a battery structure manufactured by alternately stacking the first units and the second units 20 times according to the above example 20, after the battery structure was pressed at 200 MPa. FIGS. 7C and 7D are views illustrating observation results of the intermediate (10th) interface and the lowermost interface of the battery structure manufactured by alternately stacking the first units and the second units 20 times according to the above example, after the battery structure was pressed at 300 MPa.

Referring to FIGS. 7A and 7B, it may be confirmed that, in an all-solid-state battery manufactured by pressing the battery structure according to the above example at 200 MPa, interfacial defects occurred and only 76% of actual cell performance was exhibited. On the other hand, referring to FIGS. 7C and 7D, it may be confirmed that, in an all-solid-state battery manufactured by pressing the battery structure according to the above example at 300 MPa, no interfacial defects occurred and 99% of actual cell performance was exhibited.

Thereby, it may be understood that, in order to manufacture an all-solid-state battery according to the example which is normally operated, pressure of 300 MPa or higher may be applied to a battery structure prepared by alternately stacking first units and second units 20 times.

As is apparent from the above description, as compared to the conventional process in which cell units corresponding to basic units are respectively pressed and then stacked, the present disclosure provides a process for manufacturing an all-solid-state battery in which a battery structure is prepared by stacking two or more units and is then pressed, and thus the process may be simplified.

Further, as compared to the conventional battery structure in which two or more cell units, each of which includes current collectors, electrodes and a solid electrolyte layer, are stacked, the present disclosure provides an all-solid-state battery formed by stacking units, in which electrodes are formed on both surfaces of a current collector, and thus an amount of current collectors consumed may be reduced and the all-solid-state battery may have high energy density.

Further, the battery structure in accordance with the present disclosure includes insulating members, and may thus prevent or inhibit occurrence of a short circuit at the edge part of the all-solid-state battery.

Moreover, since the all-solid-state battery in accordance with the present disclosure uses the insulating members formed of a transparent material, light from a vision apparatus may penetrate the insulating members, and thus alignment of the battery structure may be achieved and the battery structure may be stabilized.

The disclosure has been described in detail with reference to aspects thereof. However, it will be appreciated by those skilled in the art that changes may be made in these forms without departing from the principles and spirit of the disclosure, the scope of which is defined in the appended claims and their equivalents.

While this present disclosure has been described in connection with what is presently considered to be practical exemplary forms, it is to be understood that the present disclosure is not limited to the disclosed forms, but, on the contrary, it is intended to cover various modifications and equivalent arrangements included within the spirit and scope of the present disclosure.

What is claimed is:

1. An all-solid-state battery comprising:
   a plurality of first units, each first unit of the plurality of first units comprising:
      a first electrode current collector, and
      first electrode active material layers formed on both surfaces of the first electrode current collector;
   a plurality of second units, each second unit of the plurality of second units comprising:
      a second electrode current collector,
      second electrode active material layers formed on both surfaces of the second electrode current collector, and
      solid electrolyte layers formed on the second electrode active material layers,
   wherein the plurality of first units and the plurality of second units are alternately stacked,
   wherein the first electrode active material layers and the second electrode active material layers respectively abut on both surfaces of the solid electrolyte layers,
   wherein insulating members are received in spaces between edge parts of the first electrode active material layers and side surfaces of the second units,
   wherein at least one of the plurality of first units is configured such that one first electrode current collector is interposed between a pair of first electrode active material layers,
   wherein at least one of the plurality of second units is configured such that one second electrode current collector is interposed between a pair of second electrode active material layers, and
   wherein a first electrode active material layer has a thickness of 50-300 μm, a density of 1.2-3.5 g/cc, a weight of active material per unit area of 10-45 mg/cm$^2$, and a lightness value of 30-80 in CIELAB color space.

2. The all-solid-state battery of claim 1, further comprising:
   a plurality of third units, each third unit of the plurality of third units comprising a third electrode current collector, and a third electrode active material layer formed on one surface of the third electrode current collector,
   wherein each third unit is located at an outermost position of the all-solid-state battery.

3. The all-solid-state battery of claim 1, wherein an area of at least one of the plurality of first units is greater than or equal to an area of at least one of the plurality of second units.

4. The all-solid-state battery of claim 1, wherein at least one of the plurality of second units is placed on a central part of a first electrode active material layer so that the first electrode active material layer and a solid electrolyte layer are stacked to contact each other.

5. The all-solid-state battery of claim 1, wherein an area of a central part of the first electrode active material layer is greater than or equal to an area of at least one of the plurality of second units.

6. The all-solid-state battery of claim 1, wherein a sum of thicknesses of one insulating member and another insulating member adjacent thereto is the same as a thickness of at least one of the plurality of second units.

7. The all-solid-state battery of claim 1, wherein the insulating members surround side surfaces of at least one of the plurality of second units.

8. The all-solid-state battery of claim 1, wherein the insulating members are formed of a transparent material.

9. The all-solid-state battery of claim 1, wherein the first electrode current collector has a thickness of 4-20 μm.

10. The all-solid-state battery of claim 1, wherein the second electrode current collector has a thickness of 5-20 μm.

11. A method for manufacturing an all-solid-state battery, the method comprising:
   preparing at least one first unit, each first unit comprising a first electrode current collector, and first electrode active material layers formed on both surfaces of the first electrode current collector;
   forming insulating members at edge parts of the first electrode active material layers;
   preparing at least one second unit, each second unit comprising a second electrode current collector, second electrode active material layers formed on both surfaces of the second electrode current collector, and solid electrolyte layers formed on the second electrode active material layers;
   acquiring a battery structure by alternately stacking the first units and the second units; and
   pressing the battery structure,
   wherein at least one of the plurality of first units is configured such that one first electrode current collector is interposed between a pair of first electrode active material layers,
   wherein at least one of the plurality of second units is configured such that one second electrode current collector is interposed between a pair of second electrode active material layers and
   wherein a first electrode active material layer has a thickness of 50-300 μm, a density of 1.2-3.5 g/cc, a weight of active material per unit area of 10-45 mg/cm², and a lightness value of 30-80 in CIELAB color space.

12. The method of claim 11, further comprising, before the pressing the battery structure:
stacking third units, each third unit comprising a third electrode current collector, and a third electrode active material layer formed on one surface of the third electrode current collector, on outermost layers of the battery structure.

13. The method of claim 11, wherein the battery structure is configured such that a second unit is placed on a central part of a first electrode active material layer and thus the first electrode active material layer and a solid electrolyte layer are stacked to contact each other.

14. The method of claim 11, wherein a sum of thicknesses of one insulating member and another insulating member adjacent thereto is the same as a thickness of a second unit.

15. The method of claim 11, wherein the insulating members are stacked to surround side surfaces of the second units.

16. The method of claim 11, wherein the insulating members are formed of a transparent material.

17. The method of claim 11, wherein, in the preparing the first units and the preparing the second units, the first units and the second units are not pressed.

18. The method of claim 11, wherein the pressing the battery structure is performed at a pressure of 250 to 500 MPa.

19. An all-solid-state battery comprising:
a plurality of first units, each first unit of the plurality of first units comprising:
a first electrode current collector, and
first electrode active material layers formed on both surfaces of the first electrode current collector;
a plurality of second units, each second unit of the plurality of second units comprising:
a second electrode current collector,
second electrode active material layers formed on both surfaces of the second electrode current collector, and
solid electrolyte layers formed on the second electrode active material layers,
wherein the plurality of first units and the plurality of second units are alternately stacked,
wherein the first electrode active material layers and the second electrode active material layers respectively abut on both surfaces of the solid electrolyte layers,
wherein insulating members are received in spaces between edge parts of the first electrode active material layers and side surfaces of the second units,
wherein at least one of the plurality of first units is configured such that one first electrode current collector is interposed between a pair of first electrode active material layers,
wherein at least one of the plurality of second units is configured such that one second electrode current collector is interposed between a pair of second electrode active material layers, and
wherein a second electrode active material layer has a thickness of 50-300 μm, a density of 2.5-5.0 g/cc, a weight of active material per unit area of 10-35 mg/cm², and a lightness value of 40-90 in CIELAB color space.

20. A method for manufacturing an all-solid-state battery, the method comprising:
preparing at least one first unit, each first unit comprising a first electrode current collector, and first electrode active material layers formed on both surfaces of the first electrode current collector;
forming insulating members at edge parts of the first electrode active material layers;
preparing at least one second unit, each second unit comprising a second electrode current collector, second electrode active material layers formed on both surfaces of the second electrode current collector, and solid electrolyte layers formed on the second electrode active material layers;
acquiring a battery structure by alternately stacking the first units and the second units; and
pressing the battery structure,
wherein at least one of the plurality of first units is configured such that one first electrode current collector is interposed between a pair of first electrode active material layers,
wherein at least one of the plurality of second units is configured such that one second electrode current collector is interposed between a pair of second electrode active material layers, and
wherein a second electrode active material layer has a thickness of 50-300 μm, a density of 2.5-5.0 g/cc, a weight of active material per unit area of 10-35 mg/cm², and a lightness value of 40-90 in CIELAB color space.

* * * * *